United States Patent
Morris

(10) Patent No.: US 7,587,450 B2
(45) Date of Patent: Sep. 8, 2009

(54) HTTP PUBLISH/SUBSCRIBE COMMUNICATION PROTOCOL

(75) Inventor: Robert P. Morris, Raleigh, NC (US)

(73) Assignee: Swift Creek Systems, LLC, Portsmouth, NH (US)

( * ) Notice: Subject to any disclaimer, the term of this patent is extended or adjusted under 35 U.S.C. 154(b) by 596 days.

(21) Appl. No.: 11/344,696

(22) Filed: Feb. 1, 2006

(65) Prior Publication Data

US 2007/0192325 A1 Aug. 16, 2007

(51) Int. Cl.
*G06F 15/16* (2006.01)

(52) U.S. Cl. ............ 709/203; 709/217; 709/219; 709/223; 709/224; 709/229

(58) Field of Classification Search .......... 709/203, 709/217, 219, 223, 224, 229
See application file for complete search history.

(56) References Cited

U.S. PATENT DOCUMENTS

| | | | |
|---|---|---|---|
| 5,491,626 A | 2/1996 | Williams et al. | |
| 5,717,923 A | 2/1998 | Dedrick | |
| 5,838,682 A | 11/1998 | Dekelbaum et al. | |
| 5,893,083 A | 4/1999 | Eshghi et al. | |
| 5,963,913 A | 10/1999 | Henneuse et al. | |
| 5,976,395 A | 11/1999 | Ha | |
| 6,021,426 A | 2/2000 | Douglis et al. | |
| 6,029,195 A | 2/2000 | Herz | |
| 6,067,477 A | 5/2000 | Wewalaarachchi et al. | |
| 6,085,166 A | 7/2000 | Beckhardt et al. | |
| 6,148,328 A | 11/2000 | Cuomo et al. | |
| 6,240,451 B1 | 5/2001 | Campbell et al. | |
| 6,301,609 B1 | 10/2001 | Aravamudan et al. | |
| 6,353,660 B1 | 3/2002 | Burger et al. | |
| 6,363,249 B1 | 3/2002 | Nordeman et al. | |
| 6,400,381 B1 | 6/2002 | Barrett et al. | |
| 6,400,810 B1 | 6/2002 | Skladman et al. | |
| 6,430,604 B1 | 8/2002 | Ogle et al. | |
| 6,480,885 B1 | 11/2002 | Olivier | |
| 6,493,755 B1 | 12/2002 | Hansen et al. | |
| 6,549,939 B1 | 4/2003 | Ford et al. | |
| 6,587,836 B1 | 7/2003 | Ahlberg et al. | |

(Continued)

FOREIGN PATENT DOCUMENTS

WO  WO 99/009490  2/1999

OTHER PUBLICATIONS

U.S. Appl. No. 10/960,135, filed Oct. 6, 2004, Robert P. Morris.

(Continued)

*Primary Examiner*—Lashonda T Jacobs

(57) ABSTRACT

A communication protocol for distributing information related to a resource in substantially real-time to a subscriber includes a first HTTP request message for allowing the subscriber to request a subscription to the information related to the resource, where the first HTTP request message includes subscription data in a header and/or in a Uniform Resource Identifier (URI) reference associated with the first HTTP request message, and the subscription data identifies the first HTTP request message as a subscription request. The communication protocol also includes a second HTTP request message for allowing a publisher to update the information related to the resource, and an HTTP response message for allowing a publish/subscribe service to notify the subscriber of the updated information related to the resource each time the publish/subscribe service receives the second HTTP request message from the publisher.

16 Claims, 4 Drawing Sheets

U.S. PATENT DOCUMENTS

| | | | |
|---|---|---|---|
| 6,604,102 | B2 | 8/2003 | Klein et al. |
| 6,606,744 | B1 | 8/2003 | Mikurak |
| 6,643,682 | B1 * | 11/2003 | Todd et al. .................. 709/202 |
| 6,654,790 | B2 | 11/2003 | Ogle et al. |
| 6,668,167 | B2 | 12/2003 | McDowell et al. |
| 6,668,173 | B2 | 12/2003 | Greene |
| 6,675,168 | B2 | 1/2004 | Shapiro |
| 6,697,840 | B1 | 2/2004 | Godefroid et al. |
| 6,738,975 | B1 | 5/2004 | Yee et al. |
| 6,751,657 | B1 * | 6/2004 | Zothner ...................... 709/220 |
| 6,754,904 | B1 | 6/2004 | Cooper et al. |
| 6,757,722 | B2 | 6/2004 | Lonnfors et al. |
| 6,760,340 | B1 | 7/2004 | Banavar et al. |
| 6,766,362 | B1 | 7/2004 | Miyasaka et al. |
| 6,775,658 | B1 | 8/2004 | Zothner |
| 6,789,228 | B1 | 9/2004 | Merril et al. |
| 6,799,196 | B1 | 9/2004 | Smith |
| 6,836,796 | B2 | 12/2004 | Schwartz et al. ............ 709/223 |
| 6,839,735 | B2 | 1/2005 | Wong et al. |
| 6,839,737 | B1 | 1/2005 | Friskel |
| 6,853,634 | B1 | 2/2005 | Davies et al. |
| 6,907,011 | B1 | 6/2005 | Miller et al. |
| 6,912,532 | B2 | 6/2005 | Anderson |
| 6,961,765 | B2 | 11/2005 | Terry |
| 7,051,274 | B1 | 5/2006 | Cottrille et al. |
| 7,107,285 | B2 | 9/2006 | von Kaenel et al. |
| 7,111,044 | B2 | 9/2006 | Lee |
| 7,139,554 | B2 | 11/2006 | Litwin |
| 7,177,859 | B2 | 2/2007 | Pather et al. |
| 7,177,928 | B2 | 2/2007 | Sasaki et al. |
| 7,184,524 | B2 | 2/2007 | Digate et al. |
| 7,219,303 | B2 | 5/2007 | Fish |
| 7,231,596 | B2 | 6/2007 | Koren |
| 7,246,371 | B2 | 7/2007 | Diacakis et al. |
| 7,251,482 | B2 | 7/2007 | Ackermann-Markes |
| 7,254,579 | B2 * | 8/2007 | Cabrera et al. ................ 707/10 |
| 7,263,545 | B2 | 8/2007 | Digate et al. |
| 7,269,162 | B1 | 9/2007 | Turner |
| 7,302,634 | B2 | 11/2007 | Lucovsky et al. |
| 7,334,021 | B1 | 2/2008 | Fletcher |
| 7,349,980 | B1 * | 3/2008 | Darugar et al. .............. 709/238 |
| 7,412,522 | B2 * | 8/2008 | Liscano et al. .............. 709/227 |
| 7,444,379 | B2 | 10/2008 | Becker et al. |
| 7,516,210 | B2 * | 4/2009 | Liscano et al. .............. 709/224 |
| 7,523,198 | B2 * | 4/2009 | Wu et al. ..................... 709/224 |
| 2001/0025280 | A1 | 9/2001 | Mandato et al. |
| 2001/0027439 | A1 | 10/2001 | Holtzman et al. |
| 2002/0007420 | A1 | 1/2002 | Eydelman et al. |
| 2002/0016839 | A1 | 2/2002 | Smith |
| 2002/0019816 | A1 | 2/2002 | Shafrir et al. |
| 2002/0021307 | A1 | 2/2002 | Glenn et al. |
| 2002/0023132 | A1 | 2/2002 | Tornabene et al. |
| 2002/0026505 | A1 | 2/2002 | Terry |
| 2002/0029173 | A1 | 3/2002 | Goldstein |
| 2002/0042830 | A1 | 4/2002 | Bose et al. .................... 709/230 |
| 2002/0055973 | A1 | 5/2002 | Low et al. |
| 2002/0056004 | A1 | 5/2002 | Smith |
| 2002/0087594 | A1 | 7/2002 | Peters |
| 2002/0103743 | A1 | 8/2002 | Najimi |
| 2002/0103898 | A1 | 8/2002 | Moyer et al. ................ 709/224 |
| 2002/0116461 | A1 | 8/2002 | Diacakis et al. |
| 2002/0120687 | A1 | 8/2002 | Diacakis et al. |
| 2002/0120774 | A1 | 8/2002 | Diacakis |
| 2002/0130904 | A1 | 9/2002 | Becker et al. |
| 2002/0138624 | A1 | 9/2002 | Esenther et al. |
| 2002/0156885 | A1 | 10/2002 | Thakkar ...................... 709/224 |
| 2002/0169644 | A1 | 11/2002 | Greene et al. |
| 2002/0183140 | A1 | 12/2002 | Lamb |
| 2002/0184089 | A1 | 12/2002 | Tsou et al. |
| 2003/0009530 | A1 | 1/2003 | Philonenko et al. |
| 2003/0018726 | A1 | 1/2003 | Low et al. |
| 2003/0018747 | A1 | 1/2003 | Herland et al. |
| 2003/0043190 | A1 | 3/2003 | Bernius et al. |
| 2003/0046421 | A1 | 3/2003 | Horovitz et al. |
| 2003/0055898 | A1 | 3/2003 | Yeager et al. |
| 2003/0055983 | A1 | 3/2003 | Callegari |
| 2003/0058277 | A1 | 3/2003 | Bowman-Amuah |
| 2003/0065788 | A1 | 4/2003 | Salomaki |
| 2003/0084150 | A1 | 5/2003 | Hansen et al. |
| 2003/0093789 | A1 | 5/2003 | Zimmerman et al. |
| 2003/0097397 | A1 | 5/2003 | Giannetti |
| 2003/0097410 | A1 | 5/2003 | Atkins et al. |
| 2003/0119540 | A1 | 6/2003 | Mathis |
| 2003/0120734 | A1 | 6/2003 | Kagan et al. |
| 2003/0131073 | A1 | 7/2003 | Lucovsky et al. |
| 2003/0135569 | A1 | 7/2003 | Khakoo et al. |
| 2003/0144894 | A1 | 7/2003 | Robertson et al. |
| 2003/0154293 | A1 | 8/2003 | Zmolek |
| 2003/0182428 | A1 | 9/2003 | Li et al. |
| 2003/0200268 | A1 | 10/2003 | Morris |
| 2003/0211845 | A1 | 11/2003 | Lohtia et al. |
| 2003/0217098 | A1 | 11/2003 | Bobde et al. |
| 2003/0217099 | A1 | 11/2003 | Bobde et al. |
| 2003/0217109 | A1 | 11/2003 | Ordille et al. |
| 2003/0225840 | A1 | 12/2003 | Glassco et al. |
| 2003/0225843 | A1 | 12/2003 | Sakata ........................ 709/206 |
| 2003/0229674 | A1 * | 12/2003 | Cabrera et al. .............. 709/207 |
| 2003/0233537 | A1 | 12/2003 | Wohlgemuth et al. |
| 2003/0236086 | A1 | 12/2003 | Litwin |
| 2003/0236830 | A1 | 12/2003 | Ortiz et al. |
| 2003/0236831 | A1 | 12/2003 | Ortiz et al. |
| 2003/0236832 | A1 | 12/2003 | McIntyre et al. |
| 2004/0002932 | A1 | 1/2004 | Horovitz et al. |
| 2004/0002967 | A1 | 1/2004 | Rosenblum et al. |
| 2004/0002988 | A1 | 1/2004 | Seshadri et al. |
| 2004/0003042 | A1 | 1/2004 | Horvitz et al. |
| 2004/0003084 | A1 | 1/2004 | Malik et al. |
| 2004/0003090 | A1 | 1/2004 | Deeds |
| 2004/0003104 | A1 | 1/2004 | Boskovic et al. |
| 2004/0014013 | A1 | 1/2004 | Diesel et al. |
| 2004/0015553 | A1 | 1/2004 | Griffin et al. |
| 2004/0015569 | A1 | 1/2004 | Lonnfors et al. ............ 709/220 |
| 2004/0019645 | A1 * | 1/2004 | Goodman et al. ........... 709/206 |
| 2004/0034848 | A1 | 2/2004 | Moore et al. |
| 2004/0037271 | A1 | 2/2004 | Liscano et al. |
| 2004/0054887 | A1 | 3/2004 | Paulsen, Jr. et al. |
| 2004/0059781 | A1 | 3/2004 | Yoakum et al. |
| 2004/0059791 | A1 | 3/2004 | Sherman et al. |
| 2004/0064821 | A1 | 4/2004 | Rouselle |
| 2004/0092250 | A1 | 5/2004 | Valloppillil |
| 2004/0098491 | A1 | 5/2004 | Costa-Requena et al. |
| 2004/0109197 | A1 | 6/2004 | Gardaz et al. |
| 2004/0116119 | A1 | 6/2004 | Lewis et al. |
| 2004/0117458 | A1 | 6/2004 | Tominaga |
| 2004/0122896 | A1 | 6/2004 | Gourraud .................... 709/204 |
| 2004/0125941 | A1 | 7/2004 | Yoakum |
| 2004/0129901 | A1 | 7/2004 | Yamaguchi et al. |
| 2004/0133640 | A1 | 7/2004 | Yeager et al. |
| 2004/0133641 | A1 | 7/2004 | McKinnon et al. |
| 2004/0145603 | A1 | 7/2004 | Soares |
| 2004/0153506 | A1 | 8/2004 | Ito et al. |
| 2004/0158608 | A1 | 8/2004 | Friedman et al. |
| 2004/0162881 | A1 | 8/2004 | Digate et al. |
| 2004/0172455 | A1 | 9/2004 | Green et al. |
| 2004/0177116 | A1 | 9/2004 | McConn et al. |
| 2004/0177134 | A1 | 9/2004 | Lonnfors et al. |
| 2004/0179039 | A1 | 9/2004 | Blattner et al. |
| 2004/0179232 | A1 | 9/2004 | Inukai et al. |
| 2004/0183829 | A1 | 9/2004 | Kontny et al. |
| 2004/0187133 | A1 | 9/2004 | Weisshaar et al. |
| 2004/0193488 | A1 | 9/2004 | Khoo et al. |
| 2004/0201668 | A1 | 10/2004 | Matsubara et al. |
| 2004/0205124 | A1 | 10/2004 | Limprecht et al. |
| 2004/0205134 | A1 | 10/2004 | Digate et al. |

| | | | |
|---|---|---|---|
| 2004/0205142 A1 | 10/2004 | Bahr | |
| 2004/0210829 A1 | 10/2004 | Cristofari et al. | |
| 2004/0215721 A1 | 10/2004 | Szeto et al. | 709/204 |
| 2004/0215723 A1 | 10/2004 | Chadha | |
| 2004/0215732 A1 | 10/2004 | McKee et al. | |
| 2004/0216036 A1 | 10/2004 | Chu et al. | |
| 2004/0225717 A1 | 11/2004 | Cuervo | |
| 2004/0230661 A1 | 11/2004 | Rashid et al. | |
| 2004/0243941 A1 | 12/2004 | Fish | |
| 2004/0250283 A1 | 12/2004 | Duigenan et al. | |
| 2004/0254985 A1 | 12/2004 | Horstemeyer | |
| 2004/0267887 A1 | 12/2004 | Berger et al. | |
| 2005/0004984 A1 | 1/2005 | Simpson | |
| 2005/0004985 A1 | 1/2005 | Stochosky | |
| 2005/0004995 A1 | 1/2005 | Stochosky | |
| 2005/0010637 A1 | 1/2005 | Dempski et al. | |
| 2005/0021624 A1 | 1/2005 | Herf et al. | |
| 2005/0021626 A1 | 1/2005 | Prajapat et al. | |
| 2005/0021645 A1 | 1/2005 | Kulkarni et al. | |
| 2005/0027805 A1 | 2/2005 | Aoki | |
| 2005/0030939 A1 | 2/2005 | Roy et al. | |
| 2005/0039134 A1 | 2/2005 | Wiggeshoff et al. | |
| 2005/0044143 A1 | 2/2005 | Zimmermann et al. | |
| 2005/0044144 A1 | 2/2005 | Malik et al. | 709/205 |
| 2005/0044159 A1 | 2/2005 | Niemi et al. | 709/207 |
| 2005/0044242 A1 | 2/2005 | Stevens et al. | |
| 2005/0048961 A1 | 3/2005 | Ribaudo et al. | |
| 2005/0055405 A1 | 3/2005 | Kaminsky et al. | |
| 2005/0055412 A1 | 3/2005 | Kaminsky et al. | |
| 2005/0071426 A1 | 3/2005 | Shah et al. | 709/204 |
| 2005/0071428 A1 | 3/2005 | Khakoo et al. | |
| 2005/0071433 A1 | 3/2005 | Shah | |
| 2005/0071776 A1 | 3/2005 | Mansfield et al. | |
| 2005/0080848 A1 | 4/2005 | Shah | |
| 2005/0086300 A1 | 4/2005 | Yeager et al. | |
| 2005/0086309 A1 | 4/2005 | Galli et al. | |
| 2005/0096928 A1* | 5/2005 | Ruggaber et al. | 705/1 |
| 2005/0097470 A1 | 5/2005 | Dias et al. | |
| 2005/0102362 A1 | 5/2005 | Price et al. | 709/206 |
| 2005/0102366 A1 | 5/2005 | Kirsch | |
| 2005/0102389 A1 | 5/2005 | Liscano et al. | 709/224 |
| 2005/0108387 A1 | 5/2005 | Li et al. | 709/224 |
| 2005/0119012 A1 | 6/2005 | Merheb et al. | |
| 2005/0119913 A1 | 6/2005 | Hornreich et al. | |
| 2005/0125496 A1 | 6/2005 | Thuerk | |
| 2005/0131778 A1 | 6/2005 | Bennett et al. | |
| 2005/0132004 A1 | 6/2005 | Horovitz et al. | |
| 2005/0132005 A1 | 6/2005 | Horovitz et al. | |
| 2005/0132006 A1 | 6/2005 | Horovitz et al. | |
| 2005/0132016 A1* | 6/2005 | Boone | 709/207 |
| 2005/0135240 A1 | 6/2005 | Ozugur | |
| 2005/0165658 A1 | 7/2005 | Hayes et al. | |
| 2005/0188039 A1 | 8/2005 | Charters et al. | |
| 2005/0190744 A1 | 9/2005 | Sun et al. | |
| 2005/0197995 A1 | 9/2005 | Badt, Jr. et al. | |
| 2005/0213609 A1 | 9/2005 | Brusilovsky et al. | |
| 2005/0273499 A1 | 12/2005 | Goodman et al. | |
| 2005/0278637 A1 | 12/2005 | Youm et al. | |
| 2005/0280860 A1 | 12/2005 | Ito et al. | |
| 2006/0004911 A1 | 1/2006 | Becker et al. | |
| 2006/0004921 A1 | 1/2006 | Suess et al. | |
| 2006/0014546 A1 | 1/2006 | Bodin et al. | |
| 2006/0030264 A1 | 2/2006 | Morris | |
| 2006/0036679 A1* | 2/2006 | Goodman et al. | 709/203 |
| 2006/0036712 A1 | 2/2006 | Morris | |
| 2006/0087992 A1 | 4/2006 | Ganesh | |
| 2006/0088014 A1 | 4/2006 | Ganesh | |
| 2006/0190117 A1 | 8/2006 | Weczorek et al. | |
| 2006/0224688 A1 | 10/2006 | Morris | |
| 2006/0248185 A1 | 11/2006 | Morris | |
| 2006/0280166 A1* | 12/2006 | Morris | 370/352 |
| 2007/0005725 A1* | 1/2007 | Morris | 709/218 |
| 2007/0112856 A1 | 5/2007 | Schram et al. | |
| 2007/0150441 A1* | 6/2007 | Morris | 707/3 |
| 2007/0150814 A1 | 6/2007 | Morris | |
| 2007/0162360 A1 | 7/2007 | Congram et al. | |
| 2007/0168420 A1* | 7/2007 | Morris | 709/204 |
| 2007/0288580 A1 | 12/2007 | Kaminsky et al. | |
| 2008/0046510 A1 | 2/2008 | Beauchamp et al. | |
| 2008/0046556 A1 | 2/2008 | Nicholls et al. | |
| 2008/0049734 A1 | 2/2008 | Zhakov et al. | |
| 2008/0140709 A1* | 6/2008 | Sundstrom | 707/104.1 |
| 2008/0183816 A1* | 7/2008 | Morris | 709/204 |
| 2008/0313323 A1* | 12/2008 | Morris | 709/224 |

OTHER PUBLICATIONS

U.S. Appl. No. 10/960,365, filed Oct. 6, 2004, Robert P. Morris.
Rosenberg, J., "A Data Model For Presence," [online] Feb. 2005 [retrieved on May 6, 2005]; Retrieved from the Internet::<URL:http//www.softarmor.com/wgdb/docs/draft-ietf-simple-presence-data-model02.txt>, 28 pages.
"An Exploration Of Dynamic Documents," [online] 1999 [retrieved on Mar. 3, 2006]; Retrieved from the Internet: <URL:http//www.wp.netscape.com/assist/net_sites/pushpull.html>, 4 pages.
Day, M., "'HTTP Envy 'and Presence Information Protocols," [online] Sep. 1998 [retrieved on May 10, 2005]; Retrieved from the Internet:<URL:http//www.watersprings.org/pub/id/draft-day-envy-00.txt>, 4 pages.
Eatmon, R., et al., "JEP-0004: Data Forms," [online] Jan. 5, 2006 [retrieved on Feb. 16, 2006]; Retrieved from the Internet: <URL:http//www.jabber.org/jeps/jep-0004.html>, 15 pages.
Millard, P., et al., "JEP-0060: Publish-Subscribe," [online] Mar. 3, 2005 [retrieved on Feb. 16, 2006]; Retrieved from the Internet: <URL:http//www.jabber.org/jeps/jep-0060.html>, 60 pages.
Saint-Andre, P., "JEP-0119: Extended Presence Protocol Suite," [online] Jabber Software Foundation, Mar. 28, 2005 [retrieved on Aug. 4, 2005]; Retrieved from the Internet: <URL:http//www.jabber.org/jeps/jep-0124.html>, 8 pages.
Smith, D., et al., "JEP-0124: HTTP Binding," [online] Mar. 2005 [retrieved on May 10, 2005]; Retrieved from the Internet: <URL:http//www.jabber.org/jeps/jep-0124.html>, 22 pages.
KnowNow LiveBrowser [online] KnowNow, Inc., Aug. 13, 2004 [retrieved on Jun. 17, 2005] Retrieved from the Internet: <URL:http//www.knownow.com/products/browser/>, 1 page.
Lonnfors, M., et al., "Partial Publication of Presence Information," [online] Feb. 6, 2004 [retrieved Jan. 6, 2006]; Retrieved from the Internet: <URL:http//www.ietf.org/internet-drafts/draft-lonnfors-simple-partial-publish-00.txt>, 10 pages.
Liscano, R., Presence and Awareness Services: (FIW 2003 Jun. 11, 2003), University of Ottawa, School for Information Technology and Engineering, Jun. 11, 2003, 89 pages.
Sugano, H., et al., "Presence Information Data Format (PIDF)," [online] The Internet Society, May 2003 [retrieved on Aug. 4, 2005]; Retrieved from the Internet: <URL:http://www.ietf.org/proceedings/04aug/I-D/draft-ietf-impp-cpim-pidf-08.txt>, 23 pages.
Boman, K., "Presence Security Architecture" (3GPP SA3 Meeting #25, SA3-020569), Ericsson / 3rd Generation Partnership Project, Nov. 2002, 11 pages.
Presence Service; Security, Release 6 (3GPP TS 33.141 v. 6.1.0), Association of Radio industries and Business (ARIB) / 3rd Generation Partnership Project, Sep. 2004, 13 pages.
Fielding, R., et al., RFC 2616, "Hypertext Transfer Protocol—HTTP/1.1," [online] The Internet Society, Jun. 1999 [retrieved on May 6, 2005]; Retrieved from the Internt: <URL:ftp//ftp.isi.edu/in-notes/rfc2616.txt>, 145 pages.
Nielsen, H., et al., RFC 2774, "An HTTP Extension Framework" [online] The Internet Society, Feb. 2000 [retrieved on May 6, 2005];Retrieved from the Internet: <URL:ftp//ftp.isi.edu/in-notes/rfc2774.txt>, 17 pages.
Day, M., et al., RFC 2778, "A Model for Presence and Instant Messaging" [online] The Internet Society, Feb. 2000 [retrieved on May 6, 2005]; Retrieved from the Internet: <URL:http://www.ietf.org/rfc/rfc2778.txt?number=2778>, 14 pages.

Day, M., et al., RFC 2779, "Instant Messaging / Presence Protocol Requirements" [online] The Internet Society, Feb. 2000 [retrieved on May 6, 2005];Retrieved from the Internet: <URL:http://www.ietf.org/rfc/rfc2779.txt>, 22 pages.

Rosenberg, J., et al., RFC 3261, "SIP: Session Initiation Protocol," [online] The Internet Society, Jun. 2002 [retrieved on Aug. 4, 2005]; Retrieved from the Internet: <URL:http://www.ietf.org/rfc/rfc3261.txt>, 221 pages.

Peterson, J., RFC 3859, "Common Profile for Presence (CPP)" [online] The Internet Society, Aug. 2004 [retrieved on May 6, 2005] Retrieved from the Internet: <URL:http://www.ietf.org/rfc/rfc3859.txt>, 13 pages.

Peterson, J., RFC 3860, "Common Profile for Instant Messaging (CPIM)" [online] The Internet Society, Aug. 2004 [retrieved on May 7, 2005] Retrieved from the Internet: <URL:http://www.ietf.org/rfc/rfc3860.txt>, 9 pages.

Sugano, H., et al., RFC 3863, "Presence Information Data Format" [online] The Internet Society, Aug. 2004 [retrieved on May 6, 2005]; Retrieved from the Internet: <URL:http://.ietf.org/rfc/rfc3863.txt>, 24 pages.

P. Saint-Andre, E., RFC 3920, "Extensible Messaging and Presence Protocol (XMPP):Core" [online] The Internet Society, Oct. 2004 [retrieved on Jun. 6, 2005]; Retrieved from the Internet: <URL:http://.ietf.org/rfc/rfc3920.txt>, 75 pages.

P. Saint-Andre, E., RFC 3921, "Extensible Messaging and Presence Protocol (XMPP):Instant Messaging and Presence" [online] The Internet Society, Oct. 2004 [retrieved on Jun. 6, 2005]; Retrieved from the Internet: <URL:http://.ietf.org/rfc/rfc3921.txt>, 89 pages.

Ramsdell, J.D., "Simple Instant Messaging and Presence Protocol Version 2.5" [online] The MITRE Corporation, Sep. 28, 2004 [retrieved on May 10, 2005]; Retrieved from the Internet: <URL:http://simp.mitre.org/download/simp.html>, 22 pages.

Neilsen, H. F. (Microsoft) and Ruellan, H. (Canon), Ed., "SOAP 1.2 Attachment Feature," [online] W3C, MIT, ERCIM, Keio, Jun. 8, 2004 [retrieved on Aug. 4, 2005]; Retrieved from the Internet: <URL:http://www.w3org/TR/2003/REC-soap12-part0-20030624/>, 13 pages.

Mitra, N. (Ericsson), Ed., "SOAP Version 1.2 Part 0: Primer," [online] W3C, MIT, ERCIM, Keio, Jun. 24, 2003 [retrieved on Aug. 4, 2005]; Retrieved from the Internet: <URL:http://www.w3.org/TR/2004/NOTE-soap12-af-20040608/>, 47 pages.

Universal Mobile Telecommunications System (UMTS), Presence Service; Stage 1, Release 6, (3GPP TS 22.141 v. 6.3.0), European Telecommunications Standards Institute (ETSI) / 3rd Generation Partnership Project, Jan. 2005, 26 pages.

Cohen, Josh; "Generalized Event Notification Architecture over HTTP," Microsoft PowerPoint Presentation; http://egg.microsoft.com/gena/; Workshop on Internet-Scale Event Notification, Jul. 13-14, 1998, 21pp.

Osborne, et al.; "RVP: A Presence and Instant Messaging Protocol," Aug. 2000, 19 pp.

Mohr, Gordon; "WhoDP: Widely Hosted Object Data Protocol," Mar. 1998, 29 pp.

Cohen, et al.; "General Event Notification Architecture Base: Client to Arbiter," Sep. 2000, 12 pp.

Capra, et al., "Exploiting Reflection in Mobile Computing Middleware," in : ACM Sigmobile, Mobile Computing and Communications Review, vol. 6, Issue 4, pp. 34-44, Oct. 2002 [retrieved on Oct. 6, 2007] Retrieved from the Internet: <URL:http://www.lancs.ac.uk/postgrad/gracep/capra.pdf>.

Microsoft Computer Dictionary, Published May 1, 2002, Microsoft Press, Fifth Edition.

Bhatia, S., et al., "PHP: Hypertext Preprocessor for SIP," [online] Jul. 2001 [retrieved on Jul. 27, 2005]; Retrieved from the Internet: <URL:http//www.ietf.org/draft-bhatia-sipping-sip-php-00.txt>, 5 pages.

Østhus, E. C., et al., "Presence And Call Screening In VoIP," [online] Norwegian University of Science and Technology, Nov. 2004 [retrieved on Jul. 28, 2005]; Retrived from the Internet: <URL:http//www.item.ntnu.no/~lillk/stud-proj/osthus-Prosjekt_h04.pdf>, 101 pages.

Lennox, J., RFC 3050, "Common Gateway Interface For SIP," [online] The Internet Society, Jan. 2001 [retrieved on Jul. 28, 2005]; Retrieved from the Internet: <URL:http://www.ietf.org/rfc/rfc3050.txt >35 pages.

"PubSub Sidebar Adds Real-Time Monitoring of Weblogs and Newsgroups to Popular Firefox Web Browser," [online] PR Newswire Association, LLC, Oct. 26, 2004 [retrieved on Nov. 25, 2008] Retrieved from the Inetenet: <URL:http://www.accessmylibrary.com/coms2/summary_0286-14134912_ITM>, 2 pages.

* cited by examiner

HTTP PUBLISH/SUBSCRIBE COMMUNICATION PROTOCOL

RELATED APPLICATIONS

The present application is related to co-pending U.S. patent application Ser. No. 11/160,612, entitled "METHOD AND APPARATUS FOR BROWSING NETWORK RESOURCES USING AN ASYNCHRONOUS COMMUNICATIONS PROTOCOL," filed on Jun. 30, 2005, and assigned to the assignee of the present application. The present application is also related to co-pending U.S. patent application Ser. No. 11/160,157, entitled "METHOD, SYSTEM, AND DATA STRUCTURE FOR PROVIDING A GENERAL REQUEST/RESPONSE MESSAGING PROTOCOL USING A PRESENCE PROTOCOL," filed on Jun. 10, 2005, and assigned to the assignee of the present application. The present application is also related to co-pending U.S. patent application Ser. No. 11/096,764, entitled "SYSTEM AND METHOD FOR UTILIZING A PRESENCE SERVICE TO FACILITATE ACCESS TO A SERVICE OR APPLICATION OVER A NETWORK," filed on Mar. 31, 2005, and assigned to the assignee of the present application. Each of the above-cited related applications is incorporated here by reference in its entirety.

BACKGROUND

Today's more popular browsers, such as MICROSOFT'S INTERNET EXPLORER and MOZILLA FOUNDATION'S FIREFOX, use the HyperText Transport Protocol (HTTP) to exchange information over the Internet. HTTP is a request/response, synchronous, communication protocol, where one entity in a network (e.g., the browser) makes a connection to another network entity (e.g., a web server), sends a request to the other entity, and then waits for a reply from the other entity. Notably, the reply is sent only in response to the request. If a request is not made, a reply is not sent. Accordingly, information received in a reply can become stale.

Another mode of exchanging information over the Internet uses a publish/subscribe (pub/sub), asynchronous, communication protocol. Unlike HTTP, the pub/sub communications protocol allows an entity (subscriber) to subscribe to information provided by another entity (publisher). The publisher posts (or publishes) the information, e.g., data tuples, to a pub/sub service, which then selectively transmits the posted messages (through what are referred to as notify messages) to all interested parties, i.e., subscribers. The published information can be read simultaneously by any number of subscribers. Notably, in the pub/sub communications protocol, the pub/sub service transmits the information to the subscriber when the information is posted, and does not queue previously published data for retrieval when a subscriber is online such as with email and traditional topic-based message queues.

The pub/sub communication protocol is an example of an asynchronous communication protocol. The commands of an asynchronous protocol are structured such that there need not be a one-to-one correspondence between requests and responses exchanged between communication entities. In some cases a sender of information (e.g., a Publisher) via the protocol need not wait, nor expect a response from, a receiver (e.g., a Subscriber). Moreover, a receiver need not send a request for each response. That is, a receiver may receive multiple responses (e.g., Notifications) to a request (e.g., a Subscription) and/or may receive an unsolicited message (e.g., a Directed Notify). Thus, unlike HTTP where the reply is sent directly (synchronously) in response to the entity's request, the information can instead be sent in response to the publisher's posting of the information (i.e., asynchronous to the request of information). Accordingly, information received by the subscriber can be substantially up-to-date and timely.

Well known pub/sub communication protocols include presence protocols, which are used by presence services and Jabber Software Foundation's pub/sub protocol as specified in Jabber Enhancement Proposal (JEP) JEP0060: Publish-Subscribe. A presence protocol allows a presence client, e.g., a user, to subscribe to the presence information of another entity, e.g., a friend. The presence information of the friend can include the friend's status, e.g., "on-line," "out-to-lunch," and the friend's preferred communication mode. For example, a presence service typically conveys a user's presence on a network to other network users (subscribers) based on the user's connectivity to the network via a computing and/or communication device. The presence information describing a user's presence on the network can be used by applications and/or other services to provide what are referred to here as "presence applications". Presence protocol data elements, known as tuples, must have a status element. General pub/sub protocols may support features equivalent to presence protocols, but pub/sub tuples, in general, have no content restrictions.

A popular presence application is instant messaging (IM). IM applications include Yahoo's YAHOO MESSENGER, Microsoft's MSN MESSENGER, and America Online's AOL INSTANT MESSENGER. IM applications use presence services to allow users to determine whether other users are present on (e.g., connected to) a network. Presence services can also be used to determine a user's status (e.g., available, not available, and the like) and a communication address for communicating with a user. The communication address can include both a means of communicating with the user (e.g., via a telephone or email) and a corresponding contact address (e.g., a telephone number or email address).

As the popularity of presence services has grown, the number of presence applications using different presence protocols has also increased. Some presence applications use proprietary architectures and protocols to implement their presence service components, while others use architectures and protocols based on standards. Among those are the architectures and protocols described in "Request for Comments" (or RFC) documents RFC 2778 to Day et al., titled "A Model for Presence and Instant Messaging" (February 2000), RFC 2779 to Day et al., titled "Instant Messaging/Presence Protocol" (February 2000), and RFC 3921 to Saint-Andre et. al, titled "Extensible Messaging and Presence Protocol (XMPP): Instant Messaging and Presence", each of which are incorporated here in their entirety by reference. Each different presence protocol exhibits varying levels of complexity and interoperability. As a result, a user typically cannot use a generic client, such as a web browser, to support different presence services. Instead, the user must install application-specific clients for each different presence service. This can be burdensome, particular for those devices that have limited resources. This situation exists for pub/sub protocols in general.

SUMMARY

Accordingly, a pub/sub communication protocol and methods for implementing pub/sub commands using the pub/sub communication protocol are described. According to an exemplary embodiment, a communication protocol for distributing information related to a resource in substantially real-time to a subscriber includes a first HTTP request message for allowing the subscriber to request a subscription to the information related to the resource, where the first HTTP request message includes subscription data in a header and/or in a Uniform Resource Identifier (URI) reference associated with the first HTTP request message, and the subscription data identifies the first HTTP request message as a subscription request. The communication protocol also includes a second HTTP request message for allowing a publisher to update the information related to the resource, and an HTTP response message for allowing a publish/subscribe service to notify the subscriber of the updated information related to the resource each time the publish/subscribe service receives the second HTTP request message from the publisher.

According to another exemplary embodiment, a communication protocol message that allows a subscriber to request a subscription to information related to a resource includes an HTTP request message that includes subscription data in at least one of a header and a Uniform Resource Identifier (URI) reference associated with the request message. The subscription data identifies the request message as a subscription request.

According to another exemplary embodiment, a communication protocol message that notifies a subscriber when information related to a resource is updated comprises an HTTP response message sent to the subscriber each time an HTTP request message that updates the information related to the resource is received. The HTTP response message is based on subscription data associated with another HTTP request message that creates a subscription to the information related to the resource.

According to yet another exemplary embodiment, a method for subscribing to information related to a resource includes generating by a subscriber an HTTP request message and including subscription data a header and/or a Uniform Resource Identifier (URI) reference associated with the HTTP request message. The subscription data identifies the HTTP request message as a subscription request. The HTTP request message is then sent to a publish/subscribe service.

According to yet another exemplary embodiment, a method for publishing information related to a resource to at least one subscriber via a publish/subscribe service comprises generating by a publisher an HTTP request message including information related to the resource, and sending the HTTP request message to the publish/subscribe service. Data associated with the HTTP request message is updated with the information related to the resource.

According to another exemplary embodiment, a method of distributing information related to a resource between a publisher and a subscriber via a publish/subscribe service includes receiving from the subscriber a first HTTP request message for requesting a subscription to the information related to the resource. The first HTTP request message includes subscription data in a header and/or a Uniform Resource Identifier (URI) reference associated with the first HTTP request message, and identifies the first HTTP request message as a subscription request. The method further includes receiving from the publisher a second HTTP request message that includes updated information related to the resource. In response to receiving the second HTTP request message, an HTTP message is generated and sent from the publish/subscribe service to the subscriber to notify the subscriber of the updated information related to the resource.

According to another exemplary embodiment, a method of implementing publish/subscribe commands includes generating an HTTP request message including an existing HTTP method for each of a SUBSCRIBE command and a PUBLISH command. Subscription data is included in a header and/or a Uniform Resource Identifier (URI) reference associated with the HTTP request message generated for the SUBSCRIBE command, and identifies the HTTP message as a subscription request. The method further includes generating either an HTTP response message based on a correlated HTTP request message, or an HTTP request message including an existing HTTP method for a NOTIFY command.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

Figure 1:
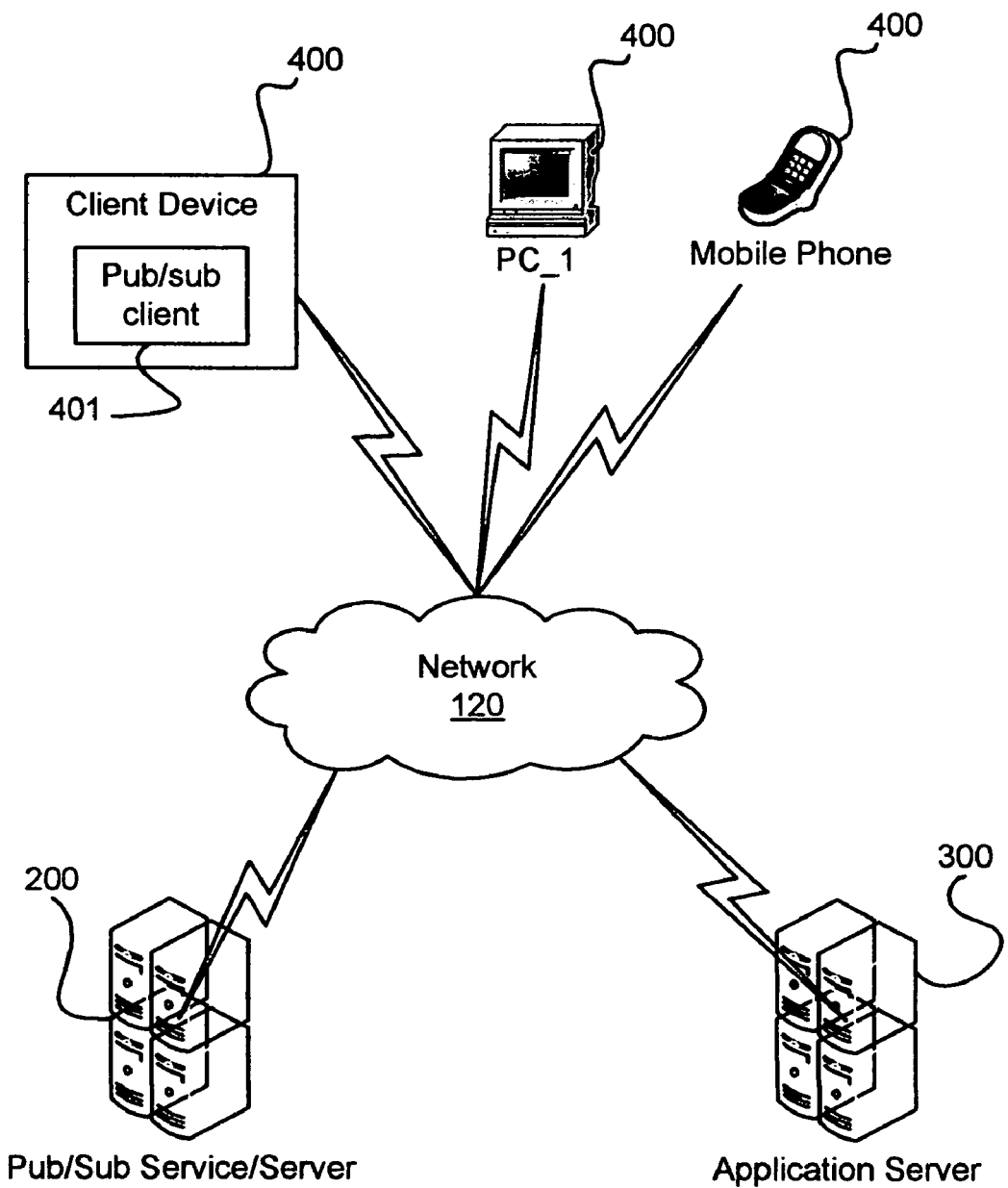
FIG. 1 illustrates an exemplary system for distributing information from an application server/service to a pub/sub client via a pub/sub server according to an exemplary embodiment.

FIG. 1 is an exemplary system for supporting pub/sub services according to an exemplary embodiment. The system 100 includes a plurality of client devices 400, a pub/sub service/server 200, and an application server 300. Throughout the description, the terms "pub/sub service" and "pub/sub server" are used interchangeably to mean a component that supports the publish/subscribe functionality between publishers and subscribers. In addition, with reference to network communication protocols, the terms "pub/sub" and "presence" are used interchangeably to describe communication protocols supporting the asynchronous network interactions.

Each client device 400 includes at least one pub/sub client 401, such as a subscriber client or browser Each pub/sub client 401 and the application server 300 are collectively referred to as pub/sub entities because they are configured to interact with the pub/sub server 200 using a pub/sub protocol. The client devices 400, pub/sub server 200 and application server 300 are communicatively coupled by a network 120, such as the internet. As is shown, the client devices 400 can be a desktop or laptop computer, a mobile telephone, and the like, such as a network-enabled camera. FIG. 1 depicts the pub/sub server 200, the application server 300, and pub/sub clients 401 communicating with one another using a pub/sub protocol, and the principles discussed herein can be applied equally to all pub/sub protocols, such as presence protocols.

According to an exemplary embodiment, each pub/sub client 401 is configured to use a pub/sub protocol to send to the pub/sub server 200 a subscription request for a tuple associated with a resource. The pub/sub server 200 receives the subscription request and registers the client's subscription to the tuple. According to an exemplary embodiment, the application server 300 can host an application configured to provide the subscription information associated with the resource to the subscribing client 401 using a pub/sub protocol via the pub/sub service 200. Note that other arrangements are contemplated. For example, all messages between the application server 300 and the pub/sub server 200 can be exchanged using a request/response (e.g., HTTP) or other synchronous communication protocol. Alternatively, messages sent from the pub/sub server 200 to the application server 300 can be carried using one type of protocol (e.g., request/response or HTTP) while messages sent from the application server 300 to the pub/sub server 200 can be carried using a different protocol (e.g., presence), and vice versa.

According to an exemplary embodiment, the pub/sub protocol used by the subscribing client 401 pub/sub server 200 and application server 300 is an HTTP pub/sub protocol that uses existing HTTP methods (or commands) and is consistent with the presence model and protocol described in RFC 2778, RFC 2779, and RFC 3921 in terms of features and function. According to the RFCs, a presence (pub/sub) protocol should support a common set of commands from a functional standpoint. These functional commands include:

Publish: Allowing a pub/sub entity, e.g., publisher server 300 or client 401 to update/provide tuple information to a pub/sub service 200;

Subscribe (Unsubscribe): Allowing a pub/sub entity 300, 401 to subscribe or unsubscribe to notifications related to specific tuple or subtuple data, and allowing a pub/sub entity 300, 401 to know who is subscribed to the presence entity's tuple data; and Notify: Allowing a pub/sub server 200 to provide information from or about a tuple to a pub/sub entity 300, 401. Notifications may be targeted to specific clients by a publisher (e.g., via a directed publish/notify command as described below) or they may be sent to all subscribers.

The phrase "presence protocol" and "pub/sub protocol", as used here, includes at least those commands to allow entities to publish information, notify entities of other entities' information, and allow entities to subscribe (unsubscribe) to other entities' information.

Several optional, functionally equivalent pub/sub commands also exist. These optional commands include:

Probe: Allowing a pub/sub service 200 to get information associated with a pub/sub entity 300, 401. This is equivalent to a Publish command except that the pub/sub service 200 requests information rather than having the pub/sub entity send the information unsolicited;

Directed Publish/Notify: Allowing a pub/sub entity to issue a publish command that results in a notify command being sent to a specific pub/sub client, thus bypassing and/or targeting the subscription function; and Fetch or Poll: Allowing a pub/sub entity to request tuple data without registering a subscription.

There is also a functional equivalent set of commands for managing a "friends list" (or "roster") related to pub/sub services as described in Section 7 of RFC 3921. This set of commands includes:

Request Roster: Allowing a pub/sub client to request a specific or default roster;

Add: Allowing a client to add an item or a pub/sub entity to a roster;

Update: Allowing a client to update a roster item; and

Delete: Allowing a client to delete an item from a roster.

According to an exemplary embodiment, the HTTP pub/sub protocol described here supports the functional commands described above by mapping existing HTTP methods (or commands), particularly those described in RFC 2616 to Fielding et al., titled "Hypertext Transport Protocol—HTTP/1.1" (June 1999), to pub/sub commands where the semantics of the pub/sub and existing HUTP methods are substantially similar. Where a pub/sub command does not have an HTTP semantic counterpart, the HTTP pub/sub protocol utilizes an existing HTTP command that is functionally similar and allows the inclusion of data in an HUTP message in order to support the pub/sub functionality without introducing a new HTTP method. In one embodiment, the data identifies a presence command and one or more associated attributes. The data can be in a header and/or in a Universal Resource Identifier (URI) reference associated with the HTTP message.

Other communications protocols, such as the General Event Notification Architecture (GENA) and the Rendez Vous Protocol (RVP), use or are based on HTTP. Nevertheless, both protocols introduce new HUTP methods/commands not described in RFC 2616 to handle presence commands that do not have a semantic equivalent in HTTP. Unlike these communication protocols, which add new commands and are thus extensions of HTTP, the HTTP pub/sub protocol according to an exemplary embodiment uses existing HTTP methods/commands and does not introduce or utilize new HTTP methods/commands to implement pub/sub capability. By using existing HTTP methods/commands, an existing web browser on a client device 400 or an existing web server can process the HTTP pub/sub protocol commands without generating errors because the data that enables the pub/sub command is included in a header or the URI reference. According to the HTTP 1.1 specification, if such data is not identifiable, it can be ignored and the command can be processed as if unidentifiable data does not exist. With a small modification, however, HTTP clients and web servers can support traditional synchronous (e.g., request/response) information exchanges, as well as asynchronous (pub/sub or presence) information exchanges using the HTTP pub/sub protocol described here.

According to an exemplary embodiment, the HTTP pub/sub protocol supports the fundamental pub/sub commands, PUBLISH, SUBSCRIBE and NOTIFY, described above in the following manner:

PUBLISH: To support the PUBLISH command, the HTTP pub/sub protocol utilizes an HTTP publish request message that includes a URI to identify a tuple of interest and either an HTTP PUT or POST method/command. According to RFC 2616, which specifies HTTP version 1.1:

The PUT method requests that the enclosed entity be stored under the supplied Request-URI. If the Request-URI refers to an already existing resource, the enclosed entity SHOULD be considered as a modified version of the one residing on the origin server. If the Request-URI does not point to an existing resource, and that URI is capable of being defined as a new resource by the requesting user agent, the origin server can create the resource with that URI.

The POST method is used to request that the origin server accept the entity enclosed in the request as a new subordinate of the resource identified by the Request-URI in the Request-Line. POST is designed to allow a uniform method to cover the following functions:

Annotation of existing resources;

Posting a message to a bulletin board, newsgroup, mailing list, or similar group of articles;

Providing a block of data, such as the result of submitting a form, to a data-handling process;

Extending a database through an append operation.

Note that the existing HTTP PUT and POST methods are semantically equivalent to the PUBLISH command. Accordingly, the HTTP pub/sub protocol can implement the PUBLISH command via a publish request message that includes either the PUT or POST method. An exemplary HTTP publish request message according to the HTTP pub/sub protocol that implements the PUBLISH command follows:

EXAMPLE 1

PUT/TFPS/Catalog/Shoes HTTP/1.1
Host: some.ps.server
User-Agent: Mozilla/5.0 (X11; U; Linux i686; en-US; rv:1.4.1) Gecko/20031114
Accept: text/html;q=0.9,text/plain;q=0.8,video/*,image/png,image/jpeg,\image/gif;q=0.2,*/*;q=0.1,application/pdif+xml
Accept-Charset: ISO-8859-1,utf-8;q=0.7,*;q=0.7
Content-Type: application/pdif+xml

```
<?xml version="1.0" encoding="UTF-8"?>
<presence xmlns="urn:ietf:params:xml:ns:pidf">
    <status>
        <basic>open</basic>
    </status>
    <contact priority="0.8">tel:+09012345678</contact>
    </tuple>
</presence>
```

SUBSCRIBE: Unlike the PUBLISH command, a SUBSCRIBE (and UNSUBSCRIBE) command does not have an equivalent existing HTTP method that allows a client to subscribe to notifications related to specified tuple or subtuple data. The HTTP GET method, however, performs a similar function but on a one time basis. According to RFC 2616:

The GET method means retrieve whatever information (in the form of an entity) is identified by the Request-URI.

The HTTP HEAD method is identical to GET method except that the server returns metadata about the entity implied by the request without transferring the entity-body itself.

According to an exemplary embodiment, to support the SUBSCRIBE command, the HTTP pub/sub protocol utilizes an HTTP subscription request message that includes a URI to identify the tuple of interest, either an HTTP GET or HEAD method/command, and subscription data that identifies the request message as a SUBSCRIBE command and identifies one or more attributes associated with the SUBSCRIBE command.

In one embodiment, the attributes can include a duration indicator that defines when the subscription expires. For example, the duration indicator can be a time period, or a value that signifies that the subscription lasts so long as the connection or session is active, or the like. Alternatively, or in addition, the duration indicator can be a count parameter that indicates that the subscription expires after the number of notifications equals or exceeds the count parameter.

In another embodiment, the attributes associated with the SUBSCRIBE command can include a subscription identifier. The subscription identifier allows the subscriber client 401 to specify an identifier so that responses can be correlated with the original subscription request associated with the HTTP GET or HEAD method/command. In one embodiment, the pub/sub server 200 may override the subscription identifier chosen by the client 401 by indicating a different subscription identifier in a first response. Similarly, the pub/sub server 200 may override the duration attribute and/or provide the duration left in each response.

In one embodiment, the subscription data identifying the SUBSCRIBE command is placed in a header in the HTTP request message. In another embodiment, the subscription data is a parameter in the URI reference in the HTTP request message. Exemplary HTTP subscription request messages according to the HTTP pub/sub protocol that implement the SUBSCRIBE command follow. Example 2 illustrates an exemplary HTTP subscription request message with a "subscription" header, and Example 3 illustrates an exemplary HTTP subscription request message with a "subscription" parameter URI:

EXAMPLE 2

GET/TFPS/Catalog/Shoes HTTP/1.1
Host: some.ps.server
User-Agent: Mozilla/5.0 (X11; U; Linux i686; en-US; rv:1.4.1) Gecko/20031114
Accept: text/html;q=0.9,text/plain;q=0.8,video/*,image/png,image/jpeg,image/gif;\q=0.2,*/*;q=0.1
Accept-Language: en-us,en;q=0.5
Accept-Charset: ISO-8859-1,utf-8;q=0.7,*;q=0.7
Subscription: duration=600s,id=5

EXAMPLE 3

GET/TFPS/Catalog/Shoes?subscription=true&duration=600s&id=5 HTTP/1.1
Host: some.ps.server
User-Agent: Mozilla/5.0 (X11; U; Linux i686; en-US; rv:1.4.1) Gecko/20031114
Accept: text/html;q=0.9,text/plain;q=0.8,video/*,image/png,image/jpeg,image/gif;\q=0.2,*/*;q=0.1
Accept-Language: en-us,en;q=0.5
Accept-Charset: ISO-8859-1,utf-8;q=0.7,*;q=0.7

In one embodiment, the subscribing client 401 can use request headers to indicate in which format the tuple data should be returned to the subscribing client 401. For instance, in the examples shown above, the client 401 indicates that the tuple data should be returned as an HTML formatted web page, which may contain images of various types. Various existing protocols have defined a number of formats for tuple data, and additional formats can be created by those familiar with pub/sub (presence) tuples. In another embodiment, the tuple data can comply by default with the format described in RFC 3863 to Sugano et al., titled "Presence Information Data Format" (August 2004), which is incorporated here in its entirety by reference. Because the PIDF is assigned a MIME type, 'application/pidf+xml', it is similar to current HTTP content data and therefore suitable for use with HTTP.

NOTIFY: Like the SUBSCRIBE command, a NOTIFY command does not have an equivalent existing HTTP method that allows a pub/sub server 200 to provide updated information from the tuple to the client 401. According to an exemplary embodiment of the HTTP pub/sub protocol, the pub/sub server 200 is configured to generate HTTP subscription response messages based on the subscription data associated with the HTTP subscription request message (described above).

In one embodiment, each HTTP subscription response message from the pub/sub server 200 includes the tuple data identified by the URI in the HTTP subscription request message. The tuple data can be placed in a payload of the HTTP subscription response message, and can be formatted in the manner specified by the client 401. Exemplary HTTP response messages to the HTTP subscription request illustrated in Example 4 follow:

EXAMPLE 4

HTTP/1.1 200 OK
Date: Wed, 8 Sep. 2004 17:32:31 GMT
Server: Apache/1.3.27 (Unix) (Red-Hat/Linux) PHP/4.1.2
Last-Modified: Wed, 8 Sep. 2004 17:02:40 GMT
Content-Length: 9119
Subscription: duration=593s,id=5
Content-Type: text/html
. . .
HTTP/1.1 200 OK
Date: Wed, 8 Sep. 2004 17:33:31 GMT
Server: Apache/1.3.27 (Unix) (Red-Hat/Linux) PHP/4.1.2
Last-Modified: Wed, 8 Sep. 2004 17:02:40 GMT
Content-Length: 8942
Subscription: duration=533s,id=5
Content-Type: text/html In another embodiment, the pub/sub server 200 can be configured to generate an HTTP notify request message that includes either a PUT or POST method, a URI identifying a tuple in the client 401 and the updated tuple data. The notify request message can be sent to the client 401 where the contents of the tuple are replaced by the updated tuple data according to the PUT or POST method. In one embodiment, the client 401 is coupled to an HTTP request handler that is configured to receive and process the HTTP request message that includes the PUT or POST method, and to generate an HTTP response message that notifies the client/browser 401 of the updated tuple data. Moreover, the HTTP request handler can be configured to send a reply to the pub/sub server 200 indicating that it successfully received the HTTP request message.

According to RFC 2616, HTTP 1.1 supports a persistent connection between the client device 400 and the pub/sub server 200. That is, the TCP/IP connection between the client device 400 and the pub/sub server 200 remains open until either the subscribing client 401 or the server 200 indicates otherwise, e.g., via a connection header in the HTTP request message or in the HTTP response message. In one embodiment, the persistent connection allows the pub/sub server 200 to traverse one or more firewalls protecting the client device 400 to transmit HTTP subscription response messages to the subscribing client 401.

In one embodiment, a persistent connection is created between the client device 400 and the pub/sub server 200 each time the subscribing client 401 sends an HTTP subscription request message to the server 200. In this embodiment, the persistent connection is associated with the HTTP subscription request, and all HTTP subscription response messages correlated to the HTTP subscription request are sent via the associated persistent connection. Here, because the persistent connection is associated with the subscription, a subscription identifier need not be used.

In another embodiment, a single persistent connection can be shared by two or more HTTP subscription requests sent by the subscribing client 401. According to RFC 2616, persistent connections allow a client 401 to "pipeline" request messages. That is, the client 401 can send multiple requests without waiting for each response. Responses must be received in the order that requests are sent. This allows responses to be correlated with requests. For asynchronous communication protocols, notifications need not be received in a given order. Because notifications in a pub/sub protocol may be received in an order different than the order of the subscription requests, a process for correlating subscription requests and notifications must be provided. In this embodiment, the subscription identifier associated with a subscription request is used to correlate an HTTP subscription response (or notification) with the subscription request. In one embodiment, the HTTP subscription response includes the subscription identifier in a header, as shown above.

In another embodiment, a client device 400 can include two or more subscribing clients 401 (not shown). For example, a client device 400 can include an IM client 401 as well as other presence clients 401 that utilize pub/sub (presence) services. Here, a single persistent connection can support two or more subscribing clients 401 by creating a session layer on top of the persistent connection. Creating the session layer on a persistent connection allows a subscribing client 401 to create and destroy a session independent of the connection setup and takedown. The session may be used to correlate notifications with responses if each session supports one subscription otherwise the correlation technique described in the previous paragraph may be used to allow a session to support multiple subscriptions simultaneously. Without the session layer, the connection is associated with only one subscribing client 401 and the start and end of the connection indicates the start and end of the session. Thus, providing a session layer allows a single connection between a device and a pub/sub server to support multiple clients operating on the device.

In one embodiment, each subscribing client 401 can create a session on the persistent connection by adding a session header to its subscription request message(s). The session header can contain a suggested session identifier, which the pub/sub server 200 can accept or replace. Accordingly, each subscription request message can be associated with a session identifier and a subscription identifier, which are then used to correlate subscription responses from the pub/sub server 200.

According to an exemplary embodiment, the HTTP pub/sub protocol also supports the optional pub/sub commands, FETCH/POLL, DIRECTED PUBLISH/NOTIFY, and PROBE, in the following manner:

FETCH and POLL: To support the FETCH command, the HTTP pub/sub protocol utilizes an HTTP request message that includes a URI identifying the tuple of interest and an HTTP GET method/command. Because the GET method is by definition a one-time retrieval of the tuple data, a subscription identifier is not required. In one embodiment, the HTTP request message for the FETCH command can include subscription data in a header. The duration attribute can be either a count value of 1 or a time value that is very short, e.g., a time value of 1 second.

While existing web pages can use scripts to support polling, this type of support is unreliable for several reasons: (1) some clients can disable scripting for security reasons; (2) script errors can halt script operation, and (3) often times support for a particular script language in a specific browser is lacking. According to an exemplary embodiment, clients can natively support polling by providing support for a FETCH command that takes a time interval to indicate time between fetch request messages and a count or time duration to indicate when to stop polling. Examples 5 and 6 illustrate exemplary HTTP fetch request messages with a "subscription" header and a "subscription" parameter URI set to 1 millisecond resulting in a single response:

EXAMPLE 5

GET/TFPS/Catalog/Shoes HTTP/1.1
Host: some.ps.server
User-Agent: Mozilla/5.0 (X11; U; Linux i686; en-US; rv:1.4.1) Gecko/20031114
Accept: text/html;q=0.9,text/plain;q=0.8,video/*,image/png,image/jpeg,image/gif;\q=0.2,*/*;q=0.1
Accept-Language: en-us,en;q=0.5
Accept-Charset: ISO-8859-1,utf-8;q=0.7,*;q=0.7
Subscription: duration=1,id=0X00a1c3

EXAMPLE 6

GET/TFPS/Catalog/
  Shoes?subscription=true&duration=1ms&id=10055
HTTP/1.1
Host: some.ps.server
User-Agent: Mozilla/5.0 (X11; U; Linux i686; en-US; rv: 1.4.1) Gecko/20031114
Accept: text/html;q=0.9,text/plain;q=0.8,video/*,image/png,image/jpeg,image/gif;\q=0.2,*/*;q=0.1
Accept-Language: en-us,en;q=0.5
Accept-Charset: ISO-8859-1,utf-8;q=0.7,*;q=0.7

DIRECTED PUBLISH: A DIRECTED PUBLISH command does not have an equivalent existing HTTP method that allows a publishing client to issue a PUBLISH command which results in a notification to one or more specific subscriber clients. According to an exemplary embodiment, to support the DIRECTED PUBLISH command, the HTTP pub/sub protocol utilizes an HTTP request message that includes a URI to identify the tuple of interest, a PUT or POST method/command, and data that identifies the request message as a DIRECTED PUBLISH command and that identifies the specific clients to whom the tuple data should be directed.

In one embodiment, the data identifying the DIRECTED PUBLISH command can include the URIs of subscriber clients and/or the URIs of a roster of clients who are to be sent notifications. The clients may or may not have active subscriptions. In another embodiment, the data identifying the DIRECTED PUBLISH command is placed in a header in the HTTP request message. In another embodiment, the data is in the URI reference associated with the request message. Example 7 illustrates an exemplary HTTP directed publish request message with a "directed" header for specifying a non-subscriber recipient and a "directed-roster" header for specifying subscriber recipients by roster ID:

EXAMPLE 7

PUT/TFPS/Catalog/Shoes HTTP/1.1
Host: some.ps.server
User-Agent: Mozilla/5.0 (X11; U; Linux i686; en-US; rv:1.4.1) Gecko/20031114
Accept: tex:/html;q=0.9,text/plain;q=0.8,video/*,image/png,image/jpeg,\image/gif;q=0.2,*/*;q=0.1,application/pdif+xml
Accept-Charset: ISO-8859-1,utf-8;q=0.7,*;q=0.7
Content-Type: application/pdif+xml
Directed-Roster=15, 2057,6
Directed: special.client.net/sysAdmin

```
<?xml version="1.0" encoding="UTF-8"?>
<presence xmlns="urn:ietf:params:xml:ns:pidf"
      entity="pres:someone@example.com">
   <tuple id="sg89ae">
      <status>
         <basic>open</basic>
      </status>
      <contact priority="0.8">tel:+09012345678</contact>
   </tuple>
</presence>
```

DIRECTED NOTIFY: A DIRECTED NOTIFY command does not have an equivalent existing HTTP method that allows a pub/sub server 200 to issue a NOTIFY command to one or more specific clients. According to an exemplary embodiment, to support the DIRECTED NOTIFY command, the HTTP pub/sub protocol utilizes the HTTP subscription response message described above where the specific client has an existing subscription to the tuple data of interest. In one embodiment, a Notify-Direct header can be added to the subscription response message so that clients can be aware of other clients who were notified. Exemplary HTTP response messages used as directed notifies using a "directed" tuple which in a response identifies the tuple and optionally may identify the publisher (not shown) are illustrated in Example 8 follow:

EXAMPLE 8

HTTP/1.1 200 OK
Date: Wed, 8 Sep. 2004 17:32:31 GMT
Server: Apache/1.3.27 (Unix) (Red-Hat/Linux) PHP/4.1.2
Last-Modified: Wed, 8 Sep. 2004 17:02:40 GMT
Content-Length: 9119
Directed: tuple=/TFPS/Catalog/Shoes
Content-Type: text/html
. . .
HTTP/1.1 200 OK
Date: Wed, 8 Sep. 2004 17:33:31 GMT
Server: Apache/1.3.27 (Unix) (Red-Hat/Linux) PHP/4.1.2
Last-Modified: Wed, 8 Sep. 2004 17:02:40 GMT
Content-Length: 8942
Directed: tuple=/TFPS/Catalog/Shoes
Content-Type: text/html In another embodiment, where the specific client does not have an existing subscription for the tuple data of interest, but does have a subscription for a different tuple, the persistent connection for the different tuple may be used to send a directed notify response message to the specific client. In this embodiment, the directed notify response message includes the Notify-Direct header to indicate to the specific client the nature of the response message.

In another embodiment, where the specific client does not have an existing subscription for any tuple, the pub/sub server 200 is configured to generate a directed notify request message, which comprises an HTTP request message that includes an HTTP PUT or POST method and the tuple contents as its payload. The URI of the directed notify request message identifies tuple data on the specific client that is associated with the message. In this embodiment, the client is coupled to the HTTP request handler, which is configured to process an HTTP request message and to generate an HTTP response message for the client/browser 401 as well as a response to the sender of the HTTP request, based on the request message including the HTTP PUT or POST method. Where the specific client is behind one or more firewalls, an existing connection between the specific client and the pub/sub server 200 is required in order to send the request message. An exemplary HTTP PUT message used as directed notify using a "directed" tuple which when received as a notify identifies the tuple and optionally may identify the publisher (not shown) is illustrated in Example 9.

EXAMPLE 9

PUT/sysAdmin HTTP/1.1
Host: special.client.net
User-Agent: Apache /1.3.27 (Unix) (Red-Hat/Linux) PHP/ 4.1.2
Accept: application/pdif+xml
Accept-Charset: ISO-8859-1,utf8;q=0.7,*;q=0.7
Directed: tuple=/TFPS/Catalog/Shoes
Content-Type: text/html PROBE: A PROBE command does not have an equivalent existing HTTP method that allows a pub/sub server 200 to retrieve information from a publisher client 401 or 300. According to an exemplary embodiment, the pub/sub server 200 is configured to generate a probe request message comprising an HTTP GET command. In this embodiment, the client is configured to handle HTTP request messages. Where the specific client is behind one or more firewalls, an existing connection between the specific client and the pub/sub server 200 is required in order to send the request message. If the client 401 has an existing connection with the pub/sub server 200, a probe header may be added to an HTTP response method associated with an HTTP request method received from the client 401. Example 10 illustrates an exemplary HTTP GET message used as PROBE with an optional "probe" header specifying the last publish received by the server. Example 11 illustrates an exemplary response to an HTTP request from a publisher in which the server has added a "probe" header identifying the tuple being probed and indicating the last update received by the server:

EXAMPLE 10

GET/TFPS/Catalog/Shoes HTTP/1.1
Host: some.publisher.net
Apache /1.3.27 (Unix) (Red-Hat/Linux) PHP/4.1.2
Accept: application/pdif+xml
Probe: last-publish=2006:01:25:03:24:13

EXAMPLE 11

HTTP/1.1 200 OK
Date: Wed, 8 Sep. 2004 17:33:31 GMT
Server: Apache/1.3.27 (Unix) (Red-Hat/Linux) PHP/4.1.2
Probe: tuple=/TFPS/Catalog/Shoes, last-publish=2006: 01:25:03:24:13
Accept:application/pdif+xml According to an exemplary embodiment, the HTTP pub/sub protocol also supports the set of commands for managing a roster related to pub/sub services, as described in Section 7 of RFC 3921, by treating rosters and members of rosters as one or more tuples. As such, the roster data can be managed using the pub/sub commands supported by the HTTP pub/sub protocol in the following manner:

REQUEST ROSTER: In one embodiment, the HTTP pub/sub protocol utilizes a FETCH or SUBSCRIBE command to request a specific or default roster. That is, the REQUEST ROSTER command is supported by an HTTP request message that includes an HTTP GET method. Example 12 illustrates an exemplary HTTP subscribe message requesting a subscription to the roster for tuple /TFPS/Catalog/Shoes:

EXAMPLE 12

GET/TFPS/Catalog/Shoes/Roster HTTP/1.1
Host: some.ps.server
User-Agent: Mozilla/5.0 (X11; U; Linux i686; en-US; rv: 1.4.1) Gecko/20031114
Accept: text/html;q=0.9,text/plain;q=0.8,video/*,image/png,image/jpeg,image/gif;\q=0.2,*/*;q=0.1
Accept-Language: en-us,en;q=0.5
Accept-Charset: ISO-8859-1,utf-8;q=0.7,*;q=0.7
Subscription: duration=600s,id=5

ADD: In one embodiment, the HTTP pub/sub protocol utilizes a PUBLISH command to add a roster or an item to a roster. That is, the ADD command is supported by an HTTP request message that includes an HTTP PUT or POST method and the URI of a new roster or roster member.

UPDATE: In one embodiment, the HTTP pub/sub protocol utilizes a PUBLISH command to modify a roster item. That is, the UPDATE command is supported by an HTTP request message that includes an HTTP PUT or POST method and the URI of an existing roster or roster member, carrying the updated data in its payload. Example 13 illustrates an exemplary HTTP publish message which may embody both the ADD and UPDATA roster commands. The payload or body of the HTTP request (not shown) contains the roster item(s) to be added and/or updated:

EXAMPLE 13

PUT/TFPS/Catalog/Shoes/Roster HTTP/1.1
Host: some.ps.server
User-Agent: Mozilla/5.0 (X11; U; Linux i686; en-US; rv:1.4.1) Gecko/20031114
Accept: text/html;q=0.9,text/plain;q=0.8,video/*,image/png,image/jpeg,\image/gif;q=0.2,*/*;q=0.1,application/pdif+xml
Accept-Charset: ISO-8859-1,utf-8;q=0.7,*;q=0.7
Content-Type: application/pdif+xml .DELETE: The HTTP pub/sub protocol uses an existing HTTP DELETE method to remove a roster or a member of a roster by using the URI of the roster tuple or the tuple of the member of the roster. In another embodiment, the HTTP pub/sub protocol uses a PUBLISH command with an empty payload and a URI identifying the roster or roster member. Example 14 illustrates an exemplary HTTP delete message requesting a deletion of roster item "14" for tuple /TFPS/Catalog/Shoes. The roster item(s) may be specified as URI parameters in an alternate embodiment.

EXAMPLE 14

DELETE/TFPS/Catalog/Shoes/Roster/14 HTTP/1.1
Host: some.ps.server
User-Agent: Mozilla/5.0 (X11; U; Linux i686; en-US; rv:1.4.1) Gecko/20031114

Accept: text/html;q=0.9, text/plain;q=0.8,video/*, image/png,image/jpeg,\image/gif;q=0.2,*/*;q=0.1,application/pdif+xml Accept-Charset: ISO-8859-1,utf-8;q=0.7,*;q=0.7

As described above, the HTTP pub/sub protocol according to an exemplary embodiment utilizes existing HTTP methods/commands. By using existing HTTP methods, the HTTP pub/sub protocol can be used to support synchronous (e.g., request/response) and asynchronous (e.g., pub/sub) interactions, thereby replacing a plurality of incompatible pub/sub protocols and HTTP with a single HTTP communication protocol.

Moreover, because the HTTP pub/sub protocol does not introduce new HTTP methods/commands, existing web browsers and web servers can, for the most part, process the request and response messages without interruption. For example, if a header (comprising the subscription data) is not recognized by the web server or browser, HTTP 1.1 directs the server or browser to ignore the header and to continue processing the method/command in the request message according to normal HTTP rules. That is, a subscription request message with a GET method and subscription data in a header is processed by an existing web server as a standard one-time retrieval of the identified resource. The pub/sub client can still operate with the web server, but in a more inefficient manner and with some loss of optional functionality. The pub/sub server can be operable without using the new header, and indicates it does not support a header by not returning a corresponding header in response to a request.

Figure 2:
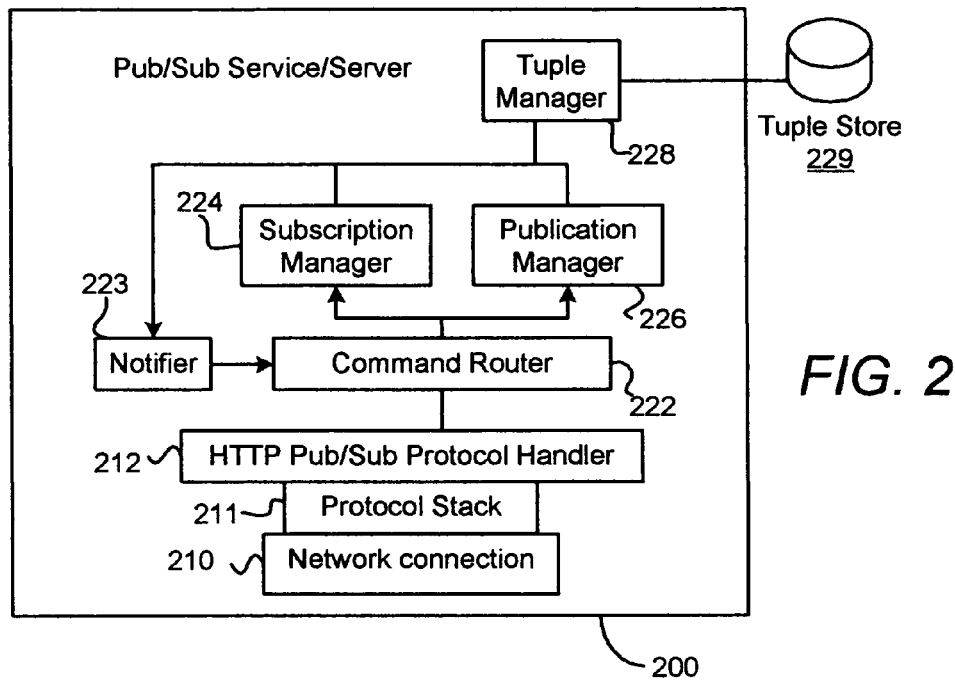
FIG. 2 illustrates an exemplary pub/sub service/server according to an exemplary embodiment.

FIG. 2 is an exemplary block diagram of a pub/sub server 200 according to an exemplary embodiment. The pub/sub server 200 includes an HTTP pub/sub protocol handler component 212 and protocol stack component 211 coupled to a network connection 210. The protocol stack component 211 is used to exchange information received or transmitted at the physical layer (e.g., the wire, air interface, or fiber optic cable) of the network 120, through the data link (e.g., ETHERNET, 802.11 WIFI), transport/network (e.g., TCP/IP) and application (e.g., XMPP) layers of the stack. The HTTP pub/sub protocol handler component 212 processes pub/sub commands received from the network 120.

The pub/sub server 200 includes a command router 222 that receives and processes pub/sub commands from the HTTP pub/sub protocol handler component 212. For example, the command router 222 directs subscribe commands to a subscription manager 224, directs publish commands to a publication manager 226, and sends notify commands on behalf of a notifier 223. The command router 222 can also process other pub/sub commands, such as PROBE and FETCH/POLL.

The subscription manager 224 processes subscription requests and other tasks associated with subscriptions. In one embodiment, the subscription manager 224 processes a subscription request by placing the subscribing client 400 on a subscription list associated with the tuple. In addition, the subscription manager 224 authorizes the client 400, manages rosters and subscription lists, and uses the notifier 223 to construct notification response messages informing the application server 300 of subscriptions and notification response messages informing clients 401 when new information is available. The publication manager 226 processes publish commands and coordinates with the subscription manager 244 the publication of tuple data to ensure that subscribing clients 401 if any, are notified via the notifier 223.

The pub/sub server 200 further includes a tuple manager 228 that is coupled to a tuple store 229. The tuple manager 228 manages tuples and tuple information. It also manages rosters for security, if provided, and stores and retrieves tuple data from the tuple store 229. If the pub/sub server 200 stores published information, the tuple manager 228 also stores and retrieves the published information.

Figure 3:
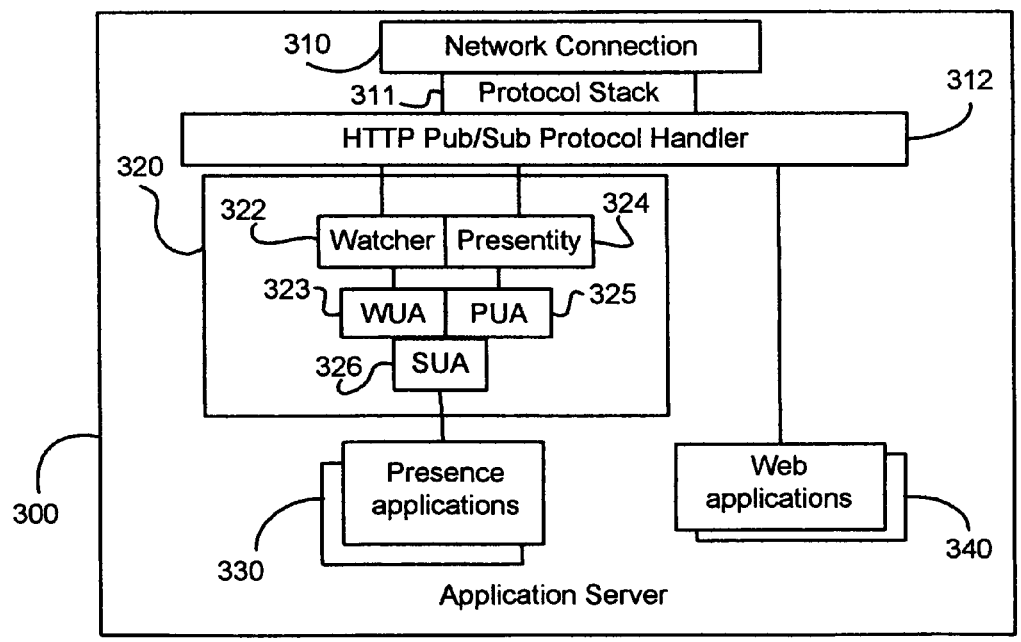
FIG. 3 illustrates an exemplary application server according to an exemplary embodiment.

FIG. 3 illustrates an exemplary application server 300 according to one embodiment. In an exemplary embodiment, the application server 300 is a publisher. That is, the application server 300 hosts applications 330, 340 that provide information related to a resource. In one embodiment, the application server 300 can be a web server that supports pub/sub applications 330, as well as web applications 340. Communications between the application server 300 and the pub/sub server 200 are conducted via the HTTP pub/sub protocol. Accordingly, like the pub/sub server 200, the application server 300 includes a network connection 310 coupled to an HTTP pub/sub protocol handler 312 and a protocol stack component 311.

In an exemplary embodiment, the application server 300 includes a resource agent component 320 between the HTTP pub/sub protocol handler 312 and one or more pub/sub applications 330. The resource agent component 320 is configured to receive notifications from and to send tuple data to the pub/sub server 200 so that it can be delivered to one or more subscriber clients 401. In one embodiment, the resource agent component 320 is configured to generate the HTTP publish request message associated with updated tuple data, and to send it to the pub/sub server 200.

In one embodiment, the resource agent component 320 can include a watcher component 322 and an associated watcher user agent (WUA) 323 configured to receive and process notifications from the pub/sub server 200. The resource agent component 320 can also include a presentity component 324 and an associated presentity user agent (PUA) 325 configured to publish tuple data to the pub/sub server 200. According to an exemplary embodiment, the resource agent component 320 can also include a service user agent (SUA) component 326 that interacts with the pub/sub applications 330 as its principal, although the SUA component 326 can also interact with an owner of the application 330 as well as other principals.

In another embodiment, the application server 300 can also host HTTP web applications 340. In this embodiment, the HTTP pub/sub protocol handler and protocol stack component 312 is coupled to one or more of the web applications 340. It should be understood that while the applications 330 and 340 shown in FIG. 3 are depicted as separate applications, the application server 300 can also host hybrid applications (not shown).

According to an exemplary embodiment, the application server 300 can exchange information with conventional HTTP web servers (not shown) and conventional HTTP clients (not shown), and can also exchange information with a pub/sub client 401 using the HTTP pub/sub protocol. Thus, the application server 300 can serve traditional web content that includes tuple information stored on servers supporting a pub/sub protocol communication model. In this manner, information on a web page can be updated in real time without embedding (in the web page) scripts that poll a web site for updated information. By eliminating scripts, a more robust and secure mechanism for presenting real-time data in a web page is provided.

Figure 4:
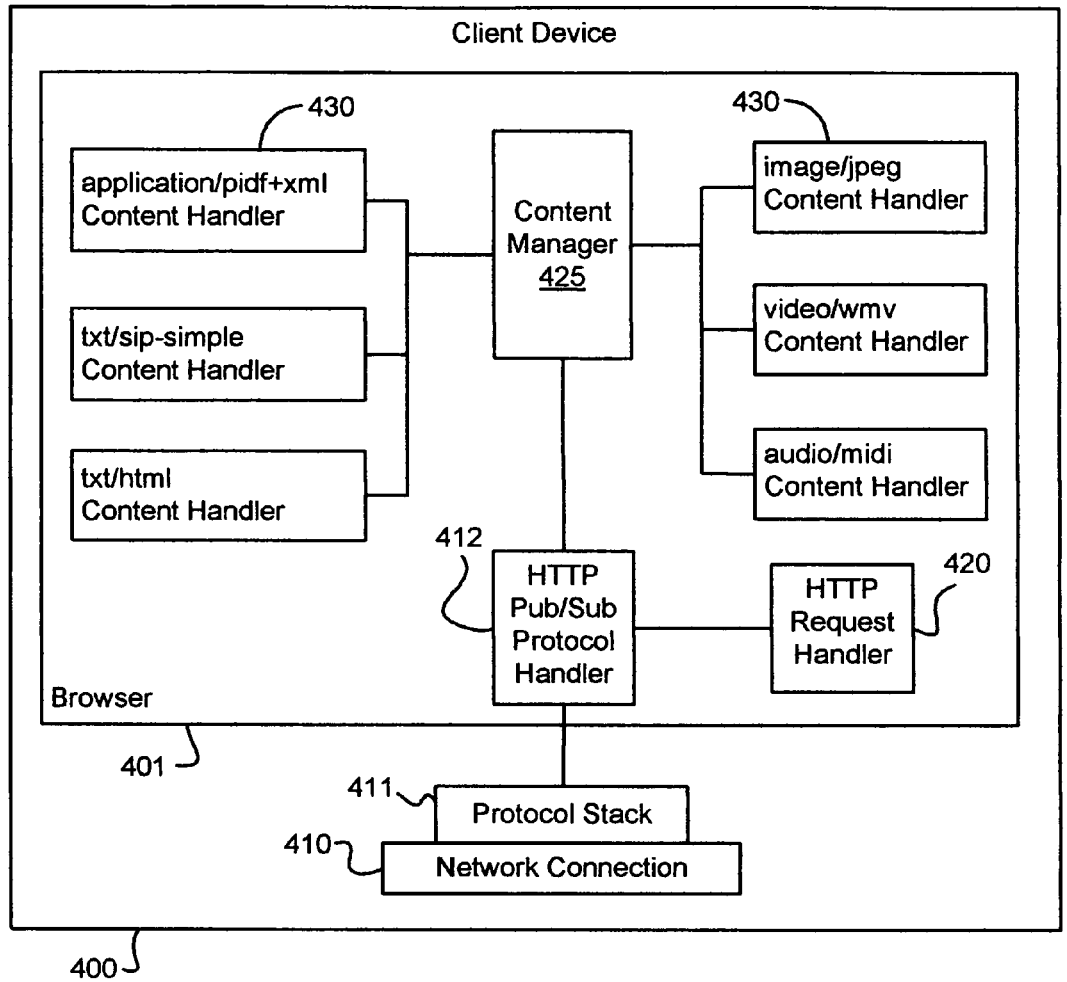
FIG. 4 illustrates an exemplary subscriber client in a client device according to an exemplary embodiment.

FIG. 4 illustrates an exemplary subscriber client 401 in a client device 400 according to an exemplary embodiment. Communications between the client 401 and the pub/sub server 200 are conducted via the HTTP pub/sub protocol. In one embodiment, the client 401 is a web browser that includes an HTTP pub/sub protocol handler 412 and protocol stack component 411. The HETP presence protocol handler 412 and protocol stack component 411 are coupled to a network connection component 410 so that the subscriber client 401 can receive and send messages from and to the pub/sub server 200.

In one embodiment, the HTTP presence protocol handler 412 is configured to generate and send HTTP subscription request messages and to receive HTTP subscription response messages to and from the pub/sub server 200. As stated above, the HTTP pub/sub protocol allows the client 401 to indicate in which format the pub/sub server 200 should return tuple data to the client 401.

Accordingly, in an exemplary embodiment, the client 401 includes a plurality of content handler components 430 for processing information in the HTTP response messages. In one embodiment, each content handler component 430 is similar to content handlers included in conventional web browsers in that the content handler component 430 is configured to process information based on the type of the information routed to the handler component 430. The type can be any of the number of available presence Multi-purpose Internet Mail Extensions (or MIME) types, such as "txt/xmpp-im", "txt/sip-simple" and "application/pidf+xml", as well as other MIME types, such as the "image/jpeg", "video/wmv", "audio/midi", and "txt/html".

In a related embodiment, the client 401 can also include a content manager component 425 coupled between the HTTP pub/sub protocol handler 412 and each of the content handler components 430. The content manager component 425 can be configured to route the information in the payload of the HTTP response message and other content received via the network connection 410 to at least one of the content handler components 430 based on the type (e.g., the MIME type) of the information and other content received.

With such an arrangement, the client 401 can exchange information with conventional HTTP servers, such as a web server (not shown), using HTTP, and can also exchange information with the application server 300 using the HTTP pub/sub protocol. Consequently, portions of the content can be presented/updated using a single communication protocol that supports both conventional HTTP signaling, and asynchronous pub/sub signaling. In this manner, application designers and client users are provided with maximum flexibility in designing/utilizing their network services.

As stated above, the client/browser 401 is configured to generate and send HTTP subscription request messages and to receive HTTP subscription response messages to and from the pub/sub server 200. The browser 401 however, is not typically configured to receive and process HTTP request messages. For example, the HTTP request messages can correspond to a DIRECTED NOTIFY command including an HTTP PUT or POST method, a PROBE command, or the like, as described above.

To accommodate this function, an HTTP request handler component 420 is coupled to the HTTP Pub/Sub Protocol Handler 412 and is configured to process HTTP request messages from the pub/sub server 200. In one embodiment, the HTTP request handler component 420 operates as a pseudo pub/sub server in that it receives the HTTP request message, generates an HTTP response message corresponding to the request message, and sends the HTTP response message to the subscriber client/browser 401. In this manner, the HTTP request message from the pub/sub server 200 is converted into an HTTP response message, which the browser 401 is configured to process. The request handler component 420 can also be configured to automatically generate an HTTP response message and return the generated response to the pub/sub server 200 to acknowledge receipt of the HTTP request (e.g., NOTIFY) message. In some cases, the automatically generated response may include information associated with the HTTP request message displayable as a web page for presentation to the user. Based on the user's activity with respect to the web page, a response to the HTTP request message can be generated and processed by the HTTP request handler component 420 for return to the pub/sub sever 200.

Figure 5:
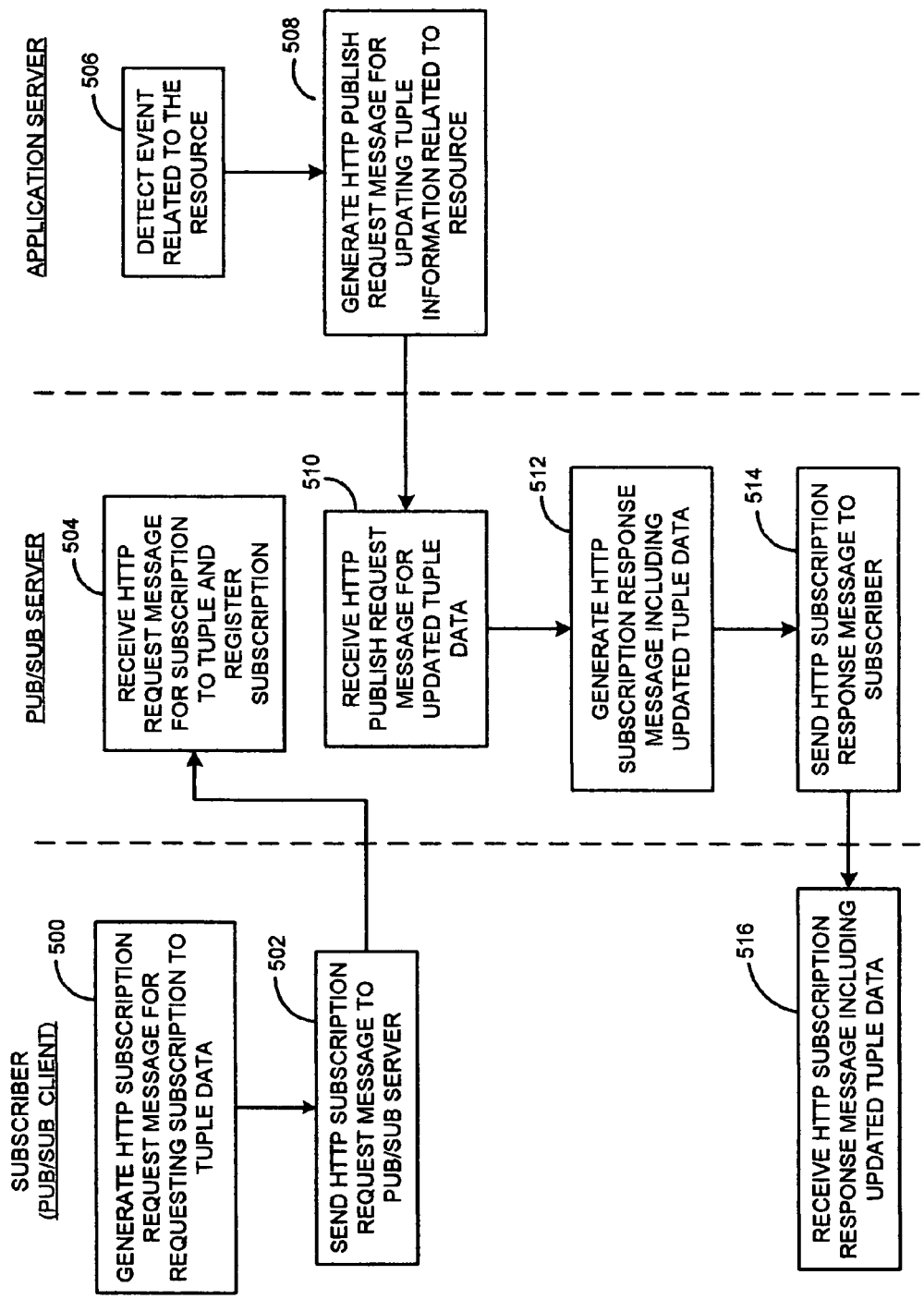
FIG. 5 is a flowchart illustrating a method for exchanging information according to an exemplary embodiment.

FIG. 5 depicts a flowchart illustrating an exemplary method for processing a subscription using the HTTP pub/sub protocol according to an exemplary embodiment. The method can be carried out using the arrangement described in conjunction with FIGS. 1-4, portions of which are referenced in the description that follows. It will be understood that other arrangements can be used to carry out the described method without departing from the scope of the described techniques. Descriptions of certain terms, the meanings of which are described in detail above in conjunction with FIGS. 1-4, are not repeated here.

Referring to FIGS. 1-5, the exemplary method begins when the subscriber client 401 generates an HTTP subscription request message that includes the GET or HEAD method, the URI of a tuple related to a resource, and the subscription data that identifies the request message as a SUBSCRIBE command (block 500). Exemplary HTTP subscription request messages are described and shown above, e.g., in EXAMPLES 2 and 3. The subscriber client 401 then sends the HTTP subscription request message to the pub/sub server 200 (block 502).

In one embodiment, where the client device 400 is protected by a firewall (not shown), a persistent connection between the client device 400 and the pub/sub server 200 is created to traverse the firewall. In one embodiment, the persistent connection can be associated with the HTTP subscription request message, such that any HTTP response message returned by the pub/sub server 200 is sent over the persistent connection. In another embodiment, the persistent connection is associated with the client 401 and can be shared by two or more HTTP subscription request messages. In this embodiment, each HTTP subscription request message can include a subscription identifier so that HTTP response messages from the pub/sub server 200 can be correlated to their respective subscriptions. In yet another embodiment where the client device 400 includes two or more subscriber clients 401 a session layer can be created on top of the persistent connection so that the persistent connection can be shared by the clients 401. In this embodiment, each subscribing client 401 can create a session and each HTTP subscription request message can include a session identifier as well as a subscription identifier.

The pub/sub server 200 receives the subscription request for the tuple via the HTTP pub/sub protocol handler 212 and protocol stack component 211 and registers the subscription (block 504). In one embodiment, the pub/sub server 200 can send a notification of the subscription to the application server 300 that hosts a pub/sub application 330 that is configured to provide the tuple data associated with the resource. Note that If the pub/sub server 200 is not configured to handle the HTTP pub/sub protocol, i.e., it lacks the HTTP pub/sub protocol handler 212. and does not understand the subscription data in the subscription request message, the pub/sub server can ignore the subscription data and treat the HTTP subscription request message as a conventional HTTP request message that includes a GET or HEAD method. That is, the pub/sub server can simply return the tuple data associated with the URI in response to receiving the subscription request message. Accordingly, because the HTTP pub/sub protocol utilizes existing HTTP methods/commands, a conventional HTTP server can handle the HTTP subscription request message, albeit in a more limited manner, without issuing an error message.

Once the subscription to the tuple is registered, the pub/sub server 200 and the client 401 wait for changes/updates to the tuple data related to the resource. When the application server 300 detects an event related to the resource associated with the tuple (block 506) and the event is one that triggers a PUBLISH command, the application server 300 generates an HTTP publish request message that includes a PUT method (as shown in Example 1) or POST method and the updated tuple data in the payload of the request message (block 508).

The pub/sub server 200 receives the HTTP publish request message (block 510) and generates an HTTP subscription response message associated with the subscription request sent in 502 (see Example 4) that includes the updated tuple data and optionally the subscription identifier and/or session identifier (block 512). In one embodiment, the pub/sub server 200 can format the updated tuple data in the manner specified by the client 401 in the subscription request message. If no such specification is made, the default format can be PIDF, as specified in RFC 3863. Once the HTTP subscription response message is completed, the pub/sub server 200 sends it to the client 401 (block 514). If the client 401 is behind a firewall, the subscription response message is sent over the persistent connection associated with the device 400. The subscriber client 401 receives the HTTP subscription response message that includes the updated tuple data (block 516), and waits for subsequent updates.

The executable instructions of a computer program as illustrated in FIG. 5 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain or store the program for use by or in connection with the instruction execution system, apparatus, or device. The computer readable medium can be, for example, but not limited to, an electronic, magnetic, optical, electromagnetic, infrared, or semiconductor system, apparatus, device, or medium.

More specific examples (a non-exhaustive list) of the computer readable medium can include the following: a portable computer diskette, a random access memory (RAM), a read only memory (ROM), an erasable programmable read only memory (EPROM or Flash memory), a portable compact disc (CD), a portable digital video disc (DVD), and the like.

Methods for providing an HTTP pub/sub protocol and a system for supporting such a protocol have been described. In one embodiment, the HTTP pub/sub protocol uses existing HTTP methods/commands to implement essential pub/sub commands, such as PUBLISH, SUBSCRIBE and NOTIFY. Unlike other pub/sub protocols, such as RVP and GENA, the HTTP pub/sub protocol does not introduce or utilize new HTTP methods/commands. Thus, existing browsers that normally can process HTTP messages, can also accept HTTP pub/sub protocol messages.

Moreover, by using existing HTTP methods/commands to implement pub/sub commands, one HTTP-based communication protocol can be used to support asynchronous and synchronous interactions, thereby merging the various communications protocols. Interoperability issues become less complicated because HTTP is well-known and widely accepted as a standard Internet communication protocol. Furthermore, existing programming application program interfaces (APIs) and tools related to HTTP can be easily extended to support new pub/sub features, rather than requiring the development of new APIs and tools. Finally, the HTTP pub/sub protocol is compatible with existing browsers and web servers and minimal modifications are required to support the new features of the pub/sub protocol requirements.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method of subscribing to information related to a resource, the method comprising:

receiving information identifying a resource;

generating by a subscriber an HTTP request message including subscription data in at least one of a header and a Uniform Resource Identifier (URI) reference associated with the HTTP request message, the subscription data uniquely identifying a tuple associated with the resource;

sending the HTTP request message to a publish/subscribe service to subscribe the subscriber to the tuple associated with the resource; and receiving an HTTP response message to the HTTP request message, the HTTP response message including a notification including updated information related to the resource from the publish/subscribe service, the HTTP response message sent in response to the publish subscribe service receiving a second HTTP request message from a publisher updating the tuple associated with the resource.

2. The method of claim 1 wherein the subscription data includes an indication of a duration of the subscription that comprises at least one of a specified time period and a specified number of HTTP response messages.

3. The method of claim 1 further comprising receiving from the publish/subscribe service an HTTP message that notifies the subscriber of an update to the information related to the resource, wherein the HTTP message is sent each time the publish/subscribe service receives another HTTP message that updates the information related to the resource.

4. The method of claim 3 wherein the subscription data includes a subscription identifier that is associated with the HTTP request message.

5. The method of claim 3 wherein the received HTTP message is an HTTP request message that includes either an HTTP PUT method or an HTTP POST method, the method further comprising:

providing in the subscriber an HTTP request handler component;

using the HTTP request handler component to generate an HTTP response message based on the subscription data associated with the received HTTP request message; and passing the generated HTTP response message from the HTTP request message handler component to the subscriber.

6. The method of claim 4 wherein each HTTP message is an HTTP response message that includes the subscription identifier associated with the HTTP request message such that each HTTP response message can be correlated to the HTTP request message.

7. The method of claim 1 further comprising:
prior to sending the HTTP request message to the publish/subscribe service, establishing a persistent connection between the subscriber and the publish/subscribe service;
utilizing the persistent connection to send the HTTP request message to the publish/subscribe service; and
receiving from the publish/subscribe service via the persistent connection an HTTP message that notifies the subscriber of an update to the information related to the resource, wherein the HTTP message is sent each time the publish/subscribe service receives another HTTP message that updates the information related to the resource.

8. The method of claim 7 further comprising:
providing a session layer on top of the persistent connection; and
allowing a first subscriber to create a first session and allowing a second subscriber to create a second session, wherein the first subscriber and the second subscriber share the persistent connection via the first and second sessions,
whereby either of the first or second sessions can be terminated without affecting the other session and the persistent connection.

9. The method of claim 1 wherein the HTTP request message includes either an HTTP GET method or an HTTP HEAD method.

10. A method of distributing information related to a resource between a publisher and a subscriber via a publish/subscribe service, the method comprising:
receiving from the subscriber a first HTTP request message for requesting a subscription to the information related to the resource, wherein the first HTTP request message includes subscription data in at least one of a header and a Uniform Resource Identifier (URI) reference associated with the first HTTP request message, the subscription data uniquely identifying a tuple associated with the resource;
receiving from the publisher a second HTTP request message including updated information related to the tuple associated with the resource; and
in response to receiving the second HTTP request message, generating and sending an HTTP response message to the first HTTP request message from the publish/subscribe service to the subscriber, including a notification including the updated information related to the tuple associated with the resource.

11. The method of claim 10 further comprising:
receiving from the publisher a plurality of HTTP request messages, wherein each of the plurality of request messages includes updated information related to the resource; and
in response to receiving each of the plurality of HTTP request messages from the publisher, generating and sending a corresponding HTTP message from the publish/subscribe service to the subscriber to notify the subscriber of the updated information related to the resource.

12. The method of claim 10 further comprising:
receiving from the publisher a third HTTP request message including updated information related to the resource and other data identifying a non-subscribing recipient to which the updated information is to be distributed;
in response to receiving the third HTTP request message, generating an HTTP request message for notifying the non-subscribing recipient of the updated information; and
using the other data to send the generated HTTP request message from the publish/subscribe service to the non-subscribing recipient.

13. The method of claim 10 wherein generating the HTTP message from the publish/subscribe service includes providing an HTTP response message based on the subscription data associated with the first HTTP request message.

14. The method of claim 10 wherein generating the HTTP message from the publish/subscribe service includes providing an HTTP request message that includes either an HTTP PUT method or an HTTP POST method.

15. A computer readable storage medium including a computer program for distributing information related to a resource between a publisher and a subscriber, the computer program comprising instructions executable in a publish/subscribe service for:
receiving from the subscriber a first HTTP request message for requesting a subscription to the information related to the resource, wherein the first HTTP request message includes subscription data in at least one of a header and a Uniform Resource Identifier (URI) reference associated with the first HTTP request message, the subscription data uniquely identifying a tuple associated with the resource;
receiving from the publisher a second HTTP request message including updated information related to the tuple associated with the resource; and
in response to receiving the second HTTP request message, generating and sending an HTTP response message to the first HTTP request message from the publish/subscribe service to the subscriber, including a notification including the updated information related to the tuple associated with the resource.

16. A computer readable storage medium including a computer program for subscribing to information related to a resource, the computer program comprising instructions executable in a subscriber for:
receiving information identifying a resource;
generating by a subscriber an HTTP request message including subscription data in at least one of a header and a Uniform Resource Identifier (URI) reference associated with the HTTP request message, the subscription data uniquely identifying a tuple associated with the resource;
sending the HTTP request message to a publish/subscribe service to subscribe the subscriber to the tuple associated with the resource; and
receiving an HTTP response message to the HTTP request message, the HTTP response message including a notification including updated information related to the resource from the publish/subscribe service, the HTTP response message sent in response to the publish subscribe service receiving a second HTTP request message from a publisher updating the tuple associated with the resource.

* * * * *

UNITED STATES PATENT AND TRADEMARK OFFICE
CERTIFICATE OF CORRECTION

PATENT NO. : 7,587,450 B2
APPLICATION NO. : 11/344696
DATED : September 8, 2009
INVENTOR(S) : Robert P. Morris It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this

Twenty-first Day of September, 2010

David J. Kappos
*Director of the United States Patent and Trademark Office*